(12) United States Patent
Cho

(10) Patent No.: US 8,797,170 B2
(45) Date of Patent: *Aug. 5, 2014

(54) METHOD OPERATING WIRELESS DEVICE ACCORDING TO POWER STATE

(75) Inventor: Sung-Goo Cho, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 368 days.

This patent is subject to a terminal disclaimer.

(21) Appl. No.: 13/235,709

(22) Filed: Sep. 19, 2011

(65) Prior Publication Data

US 2012/0007733 A1   Jan. 12, 2012

Related U.S. Application Data

(63) Continuation of application No. 12/276,713, filed on Nov. 24, 2008, now Pat. No. 8,022,833.

(30) Foreign Application Priority Data

Dec. 7, 2007   (KR) .................. 10-2007-0126636

(51) Int. Cl.
*G08B 21/00* (2006.01)
(52) U.S. Cl.
USPC ..... 340/636.1; 324/425; 370/318; 455/127.1; 455/522
(58) Field of Classification Search
USPC ............ 340/636.1, 635; 455/522, 127.1, 527; 324/425–437; 370/318, 328, 335, 342
See application file for complete search history.

(56) References Cited

U.S. PATENT DOCUMENTS

| | | | | |
|---|---|---|---|---|
| 7,148,807 | B2 * | 12/2006 | Moro et al. | 340/636.1 |
| 7,277,719 | B2 * | 10/2007 | Klassen et al. | 455/466 |
| 7,657,273 | B2 * | 2/2010 | Haartsen | 455/522 |
| 7,894,783 | B2 * | 2/2011 | Bulmer | 455/127.5 |
| 2004/0204181 | A1 * | 10/2004 | Cromer et al. | 455/574 |
| 2005/0041473 | A1 * | 2/2005 | Pua et al. | 365/185.17 |
| 2005/0144334 | A1 | 6/2005 | Hamdi et al. | |
| 2008/0101138 | A1 * | 5/2008 | Jo | 365/193 |

FOREIGN PATENT DOCUMENTS

| | | |
|---|---|---|
| KR | 1020070018270 A | 2/2007 |
| KR | 1020070028534 A | 3/2007 |

OTHER PUBLICATIONS

Korean Office Action Dated Nov. 19, 2013 of Korean Patent Application No. 10-2007-0126636.
"Wireless Universal Serial Bus Specification" May 12, 2005.

* cited by examiner

*Primary Examiner* — George Bugg
*Assistant Examiner* — Edny Labbees
(74) *Attorney, Agent, or Firm* — Volentine & Whitt, PLLC

(57) ABSTRACT

A method of operating a wireless memory device is provided. In the method, the wireless memory device detects the power state of a power supply source in response to a power measurement command received from a host and controls data transmission/reception based on the measured power state.

22 Claims, 4 Drawing Sheets

METHOD OPERATING WIRELESS DEVICE ACCORDING TO POWER STATE

CROSS-REFERENCE TO RELATED APPLICATIONS

This application is a continuation application of application Ser. No. 12/276,713 filed on Nov. 24, 2008, which is hereby incorporated for all purposes.

BACKGROUND

1. Technical Field

The present invention relates generally to a method of operating a wireless device. More particularly, the invention relates to a method of controlling the transmission and reception of data between a wireless device and a host according to the power state of the wireless device.

2. Description of Related Art

Conventional wireless devices (e.g., cellular telephones, personal digital assistants (PDAs), laptop computers, GPS devices, etc.) perform wireless communication of data with a host using one or more communication protocols, such as Institute of Electrical and Electronics Engineers (IEEE) 802.11, Bluetooth, Infrared Data Association (irDA), Wireless Universal Serial Bus (WUSB), etc. The quality (e.g., transmission range, signal-to-noise ratio, etc.) of the communicated data is product of many factors, including the power state of the wireless device. Unlike devices receiving power from hardwired electrical mains, portable wireless devices operate using an internal power supply, such as a battery. Thus, the available operating period for a wireless device is limited by its power state.

Most conventional wireless devices include a shut-down mechanism and corresponding control protocol that terminates operation of the wireless device once available power from the internal power supply fails below a detected threshold. However, shut-down operations may terminate wireless device operation during data transmission or reception. Under such circumstances, not only may the data being communicated be lost or corrupted, but also certain internal files associated with the ongoing communication may be lost within the wireless device.

SUMMARY

In one embodiment, the invention provides a method of operating a wireless device, the method comprising; extracting a power measurement command from a wireless signal received from a host, detecting a power state for a power supply source in response to the power measurement command and generating a power state indication based on the detected power state, and controlling transmission of payload data based on the power state indication.

In another embodiment, the invention provides a method of operating a wireless device, the method comprising; extracting a power measurement command from a wireless signal received from a host, detecting a power state for a power supply source in response to the power measurement command and generating a power state indication based on the detected power state, and controlling reception of payload data based on the power state indication.

DESCRIPTION OF EMBODIMENTS

This application claims priority under 35 U.S.C. §119 to Korean Patent Application No. 10-2007-0126636 filed on 7 Dec. 2007, the subject matter of which is hereby incorporated by reference Embodiments of the invention now will be described with reference to the accompanying drawings. This invention may, however, be embodied in many different forms and should not be construed as being limited to only the illustrated embodiments. Rather, the embodiments are presented as teaching examples.

As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 1:
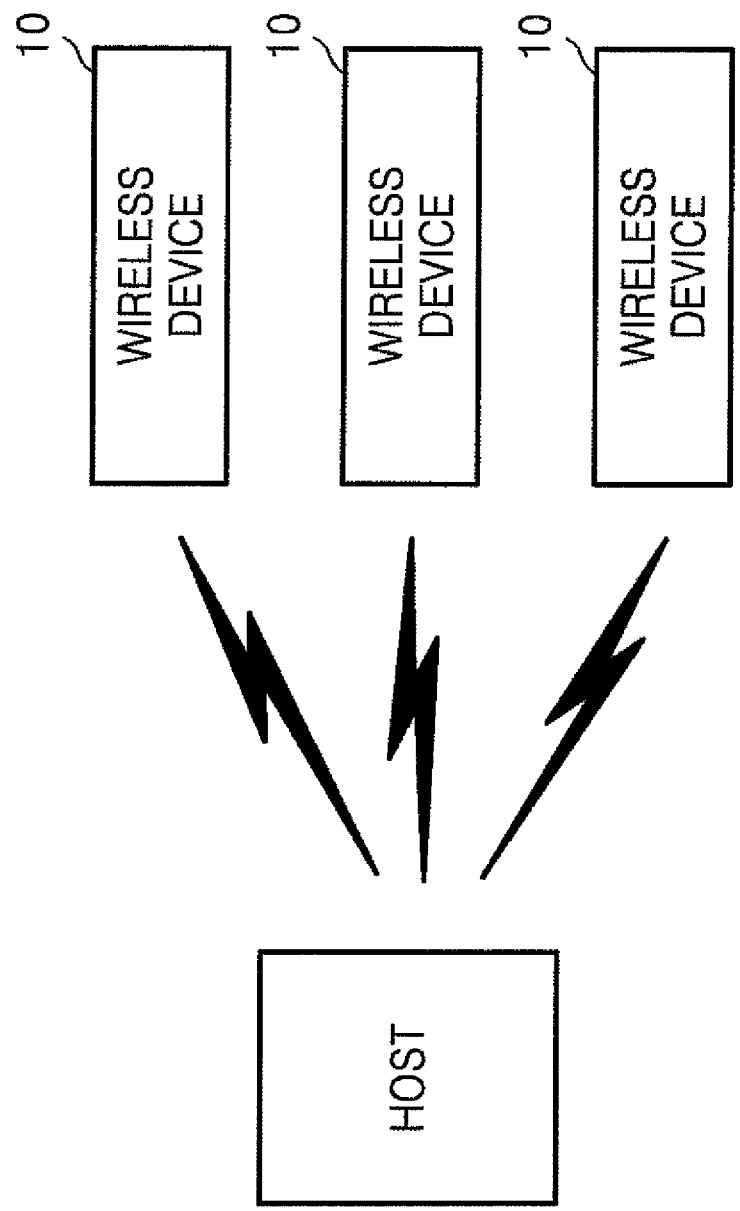
FIG. 1 conceptually illustrates a wireless network including a host and multiple wireless devices according to an embodiment of the invention.

FIG. 1 conceptually illustrates a wireless network susceptible to the benefits afforded by incorporation of a host and one or more wireless devices 10 designed and/or operated in accordance with an embodiment of the invention.

The host may be a computer, a multimedia device, or a mobile device such as a PDA or a mobile terminal. Each wireless device 10 and the host may conduct wireless data communication using, for example, the conventionally understood protocol commonly referred to as the Wireless Universal Serial Bus (WUSB). WUSB operates in an Ultra Wideband (UWB) frequency range (i.e., 3.1 to 10.6 GHz) and is capable of sending up to 480 Mbps within a distance of 10 meters. Other data communications protocols may also or alternately be used within wireless networks incorporating one or more wireless devices designed and/or operated in accordance with an embodiment of the invention.

Figure 2:
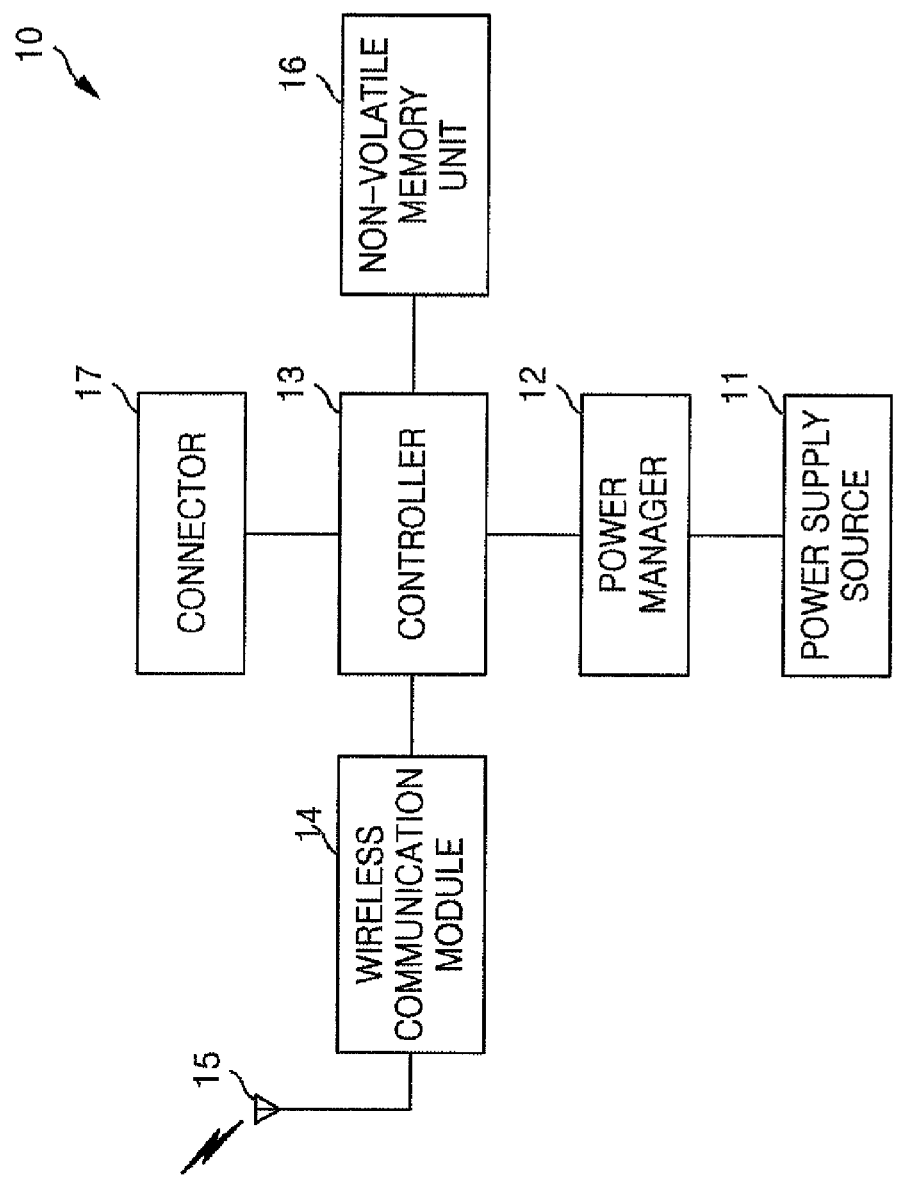
FIG. 2 is a block diagram of a wireless device according to an embodiment of the invention.

FIG. 2 is a general block diagram of a wireless device 10 operable within an embodiment of the invention. Referring to FIG. 2, wireless memory device 10 comprises a power supply source 11, a power manager 12, a controller 13, a wireless communication module 14, an antenna 15, and a non-volatile memory unit 16.

Power supply source 11 supplies the power necessary for the operation of wireless memory device 10. Power supply source 11 may be a rechargeable battery, an alkaline battery, a button cell, a fuel cell, etc.

Power manager 12 detects the power state of power supply source 11 in response to a power measurement command received from controller 13, and then outputs power state indication to controller 13 based on the detected power state. A user may define a time interval at which controller 13 generates the power measurement command, and generation of the power measurement command by controller 13 may come in response to a control signal received from the host. Alternatively, the user may initiate generation of the power measurement command.

The power state indication may indicate a usable time for wireless device 10, a residual amount of power in power supply source 11, or a ratio of current power to maximum power of power supply source 11, etc.

Controller 13 extracts data and commands from a digital signal demodulated by wireless communication module 14 and then outputs received digital data to non-volatile memory unit 16 as well as status information indicating the operative state of wireless device 10. Extracted commands are signals generated by the host to control operation of wireless device 10. Table 1 below lists exemplary encoding values of the status information request commands of the host and corresponding status information returned by wireless device 10, assuming wireless device 10 and the host are using WUSB.

TABLE 1

| Encoding values | Status information |
| --- | --- |
| 0000H | USB 2.0 standard status |
| 0001H | Wireless USB feature |
| 0002H | Channel information |
| 0003H | Received data |
| 0004H | MAS availability |
| 0005H | Current transmit power |
| 0006H | Device power state indication |

The encoding values 0000H to 0005H are defined by a USB 2.0 standard as requesting specific status, but the encoding value 0006H can be defined by a user. In certain embodiments of the invention, the encoding value 0006H may be defined as requesting power state indication for wireless device 10.

Data may be received from the host and stored in non-volatile memory unit 16 in response to a write command generated by the host. Similarly, data may be provided from non-volatile memory unit 16 in response to a read command generated by the host.

In controlling data communication with the host based on the power state indication, when the power of power supply source 11 drops below a threshold value while data is being transmitted to the host, controller 13 may send power deficient state information to the host, store overhead information for the data being transmitted, and interrupt transmission of the payload data (e.g., requested read data). The threshold value for the power of power supply source 11 may be set by the user.

Overhead information for the data being transmitted may include, for example, the storage location address for payload data in non-volatile memory unit 16, data block size for the requested payload data, the location and size of residual payload data to be transmitted, etc. If such overhead information is received and stored, the associated payload data may be efficiently re-transmitted starting from defined "next address" associated with the residual payload data (i.e., payload data not transmitted before a communication interruption). The host may store the overhead information at or near the beginning of a communication cycle and retain the overhead information until successful communication of the payload data. Thereafter, should the power provided by power supply source 11 increase above the threshold value (i.e., by replacement of a battery), controller 13 may complete payload data transmission to the host by resuming data transmission in relation to the next address and the updated power state indication.

In similar manner, when the power of power supply source 11 drops below the threshold value while receiving data from the host, controller 13 may send a power deficient state indication to the host and then store received payload data. The power deficient state indication may include a "last address" received and stored by wireless device 10 indicating the end of a received portion of the payload data. Thereafter, when power provided by power supply source 11 increases above the threshold value, controller 13 sends a data receivable power sufficient state indication to the host, and the host may resume transmission of the payload data beginning at the last address. Of note, either one or both of the power deficient state indication and power sufficient state indication may include last address information or similar data effectively communicating a previously received payload data portion. Such data may be page related, block related, or sub-block related information, for example.

Wireless memory device 10 may further include a connector 17 adapted to connect controller 13 with the host via a hardwired connection. For example, when wireless device 10 performs data communication with the host using a USB standard, connector 17 may be a male USB connector.

Wireless communication module 14 demodulates a wireless analog signal received through antenna 15 into a digital data and/or related signals. It also modulates digital data and/or related signals provided by controller 13 into a wireless analog signal in accordance to a defined communication protocol. Antenna 15 transmits the wireless analog signal to and receives a wireless analog signal from the host according to the defined communication protocol. For instance, when wireless memory device 10 uses WUSB, antenna 15 transmits and receives analog signals in a frequency range of between 3.1 and 10.6 GHz.

Non-volatile memory unit 16 stores data received from the host in response to a write command and outputs data in response to a read command. Non-volatile memory unit 16 may be NAND flash memory.

When the host receives the power deficient state indication from wireless device 10, the host may cause a visual display indicting the power deficient state by wireless device 10 or may otherwise indicate (vibration or audio alarm) to the user that a power deficient state has been reached.

Figure 3:
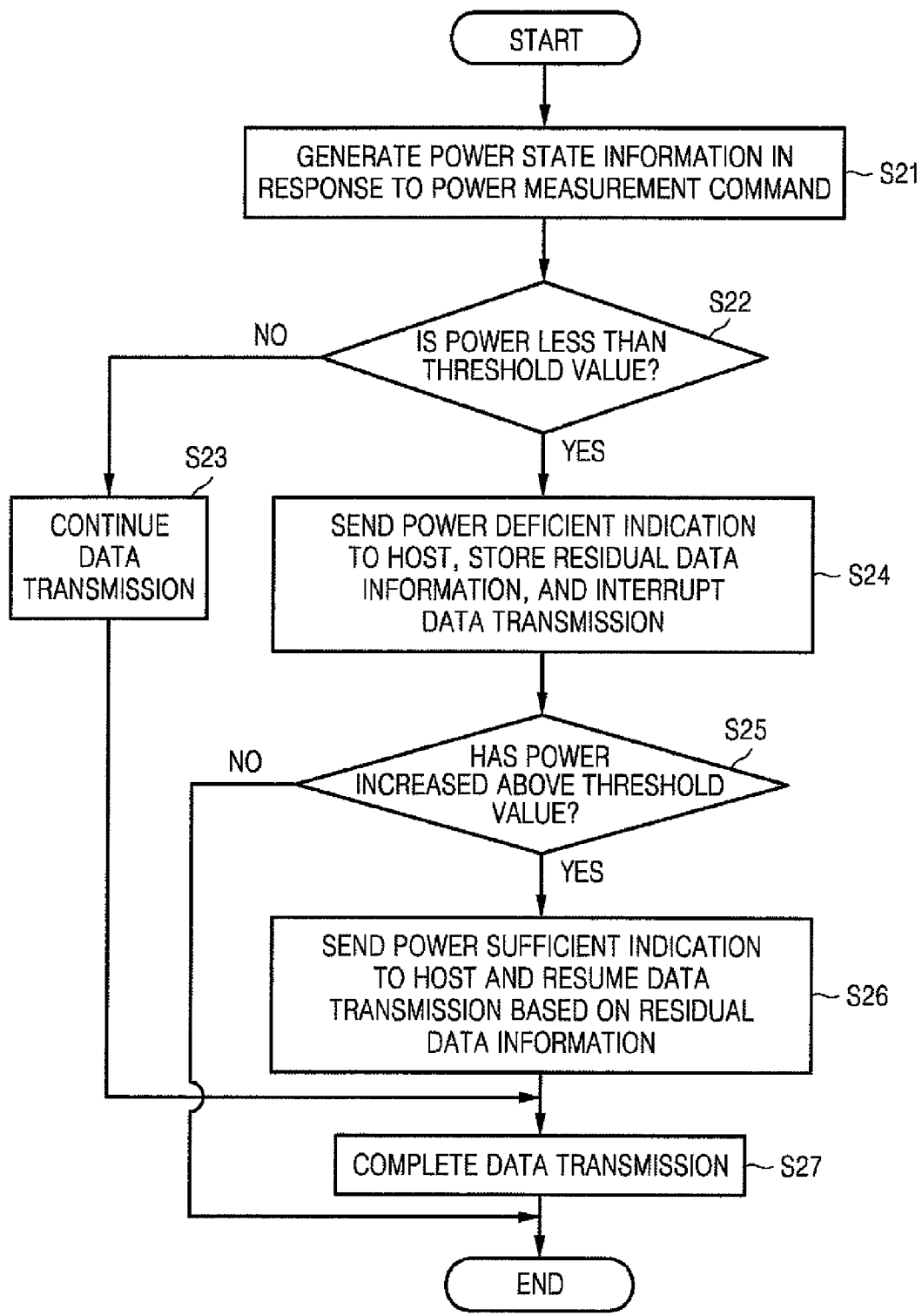
FIG. 3 is a flowchart summarizing a method of controlling a wireless device according to its power state according to an embodiment of the invention.

FIG. 3 is a flowchart summarizing a control method for wireless device 10 responsive to the power state of power supply source 11 according to an embodiment of the invention. The example of FIG. 3 is drawn to an outgoing data transmission (e.g., a read data response). The method of FIG. 3 will be described assuming a wireless device 10 such as the one shown in FIG. 2.

First, antenna 15 receives an analog signal from the host. Wireless communication module 14 demodulates the analog signal into digital data and/or related control signals. Controller 13 extracts a power measurement command from the digital data and/or control signals.

Then, power manager 12 detects the power being provided by power supply source 11 in response to the power measurement command and generates power state indication based on the detection result (S21). Controller 13 then determines whether the detected power for power supply source 11 has fallen below (is less than) a defined threshold value based on the power state indication (S22).

If it is determined that the power provided by power supply source 11 is not less than the threshold value, controller 13 continues the requested data transmission (S23). When data transmission is complete, controller 13 sends transmission completion state information to the host (S27). However, when the power provided by power supply source 11 is less than the threshold value, controller 13 sends power deficient state indication to the host, stores residual data information such as a next address, and then interrupts the data transmission (S24).

Upon interruption of the data transmission, controller 13 determines whether the power provided by power supply source 11 has increased above the threshold value (S25). When it is determined that the power provided by power supply source 11 has increased above the threshold value, controller 13 sends a power sufficient indication to the host, and then resumes the data transmission based on the stored residual data information (S26). In certain embodiments of the invention, the host may store residual data information received from wireless device 10 or extracted in relation to the previously received portion of payload data.

However, when it is determined that the power provided by power supply source 11 has not increased above the threshold value during a defined period of time, controller 13 may terminate the data transmission without transmission of the residual data. Although not shown in FIG. 3, controller 13 may repeat the second power threshold detection step (S25) until a maximum count is reached in order to time out transmission of the residual data. Alternatively, controller 13 may control (i.e., interrupt, resume, and/or terminate) the data transmission according to its own decision made based on the measured power or at the request of the host.

Figure 4:
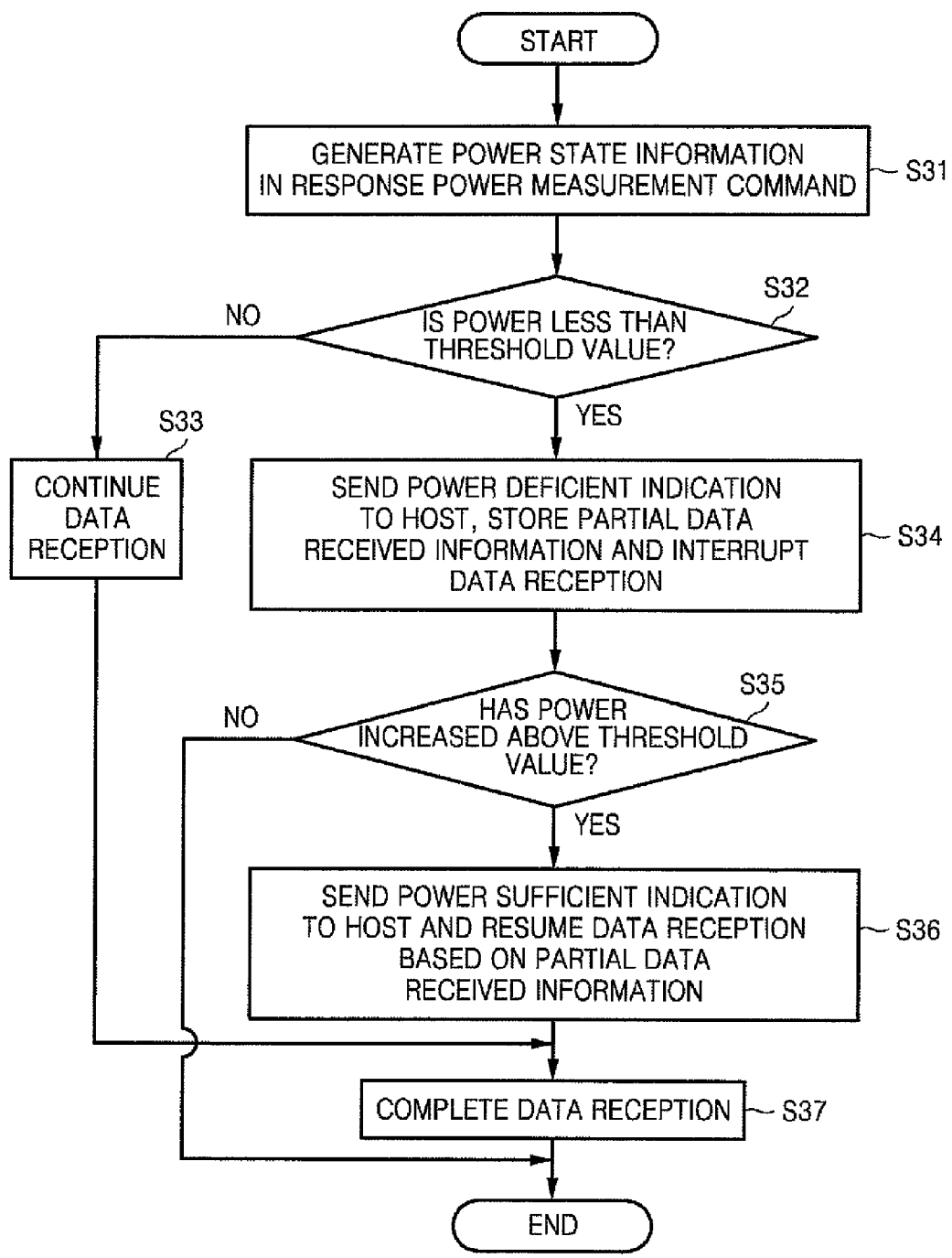
FIG. 4 is a flowchart summarizing method of controlling a wireless device according to its power state according to another embodiment of the invention.

FIG. 4 is a flowchart summarizing a control method for wireless device 10 responsive to the power state of power supply source 11 according to another embodiment of the invention. The example of FIG. 4 is drawn to an incoming data transmission (e.g., a write operation). The method of FIG. 4 will be described again assuming a wireless device 10 such as the one shown in FIG. 2.

First, antenna 15 receives an analog signal from a host. Wireless communication module 14 demodulates the analog signal into digital data and/or related control signals. Controller 13 extracts a power measurement command from the digital data and/or control signals.

Power manager 12 detects the power provided by power supply source 11 in response to the power measurement command and generates power state indication based on a detection result (S31). Controller 13 determines whether the power provided by power supply source 11 is less than a threshold value based on the power state indication in (S32).

When it is determined that the power provided by power supply source 11 is not less than the threshold value, controller 13 continues data reception (S33). When the data reception is completed, controller 13 sends reception completion state information to the host (S37). However, when the power of the power supply source 11 is less than the threshold value, controller 13 sends power deficient state indication to the host, stores partial data received information, such as a last address received indication, and then interrupts the data reception (S34).

Upon the interruption of the data reception, controller 13 determines whether the power provided by power supply source 11 has increased above the threshold value (S35). When it is determined that the power of the power supply source 11 has increased above the threshold value, controller 13 sends the power sufficient indication to the host, the host resumes data transmission based on the partial data received information, and resumes the data reception operation (S36). When it is determined that the power provided by power supply source 11 is not increased above the threshold value for a predetermined period of time, controller 13 may terminate the data reception operation as described above.

In the above embodiments, a wireless device controls data transmission and reception according to power state indication. In other embodiments, the host may control data transmission and reception based on power state indication provided by the wireless device. In addition, when the data transmission and reception is controlled based on the power information, relevant information may be provided to a user. For instance, when the data transmission or reception is interrupted due to low power, the host may display the power information and/or information about the interruption of data transmission or reception to provide the information to the user.

The various embodiments of the invention may be implemented in hardware, software, firmware, or combination thereof. When an embodiment of the invention is implemented in software, it may be embodied as computer readable codes or programs on a computer readable recording medium. The computer readable recording medium is any data storage device that can store data which can be thereafter read by a computer system. Examples of the computer readable recording medium include read-only memory (ROM), random-access memory (RAM), electrically erasable programmable ROM (EEPROM), and flash memory.

As described above, embodiments of the invention can prevent transmitting/receiving data or related data files resident in a wireless device from being lost or corrupted due to lack of power in the wireless device during data communication between a host and the wireless device.

While the present invention has been particularly shown and described with reference to exemplary embodiments thereof, it will be understood by those of ordinary skill in the art that various changes in forms and details may be made therein without departing from the scope of the present invention as defined by the following claims.

What is claimed is:

1. A method of operating a wireless device including a power supply source, a controller, and a non-volatile memory unit, the method comprising:

receiving a wireless signal from a host device, wherein the wireless signal is defined in accordance with a serial data communication protocol;

extracting a write command and payload data from the wireless signal;

receiving and storing the payload data in the non-volatile memory unit in response to the write command;

generating a power measurement command by the controller;

detecting a power state for the power supply source in response to the power measurement command and generating a power state indication based on the detected power state;

if the power state indication indicates the power state is above a threshold value, continuing the receiving and storing of the payload data until all of the payload data is received and stored; and if the power state indication indicates the power state is below the threshold value, transmitting a power deficient indication from the wireless device to the host and interrupting the receiving and storing of the payload data.

2. The method of claim 1, further comprising:
following the interrupting of the receiving and storing of the payload data, determining that the power state has increased above the threshold value; and thereafter,
transmitting a power sufficient indication from the wireless device to the host; and
resuming the receiving and storing of the payload data until all of the payload data is received and stored.

3. The method of claim 1, wherein the power state indication enables a user indication regarding a usable residual time for the wireless device related to power remaining in the power supply source.

4. The method of claim 1, wherein the power state indication enables a user indication regarding a ratio of current power to maximum power for the power supply source.

5. The method of claim 2, further comprising:
following the receiving and storing of all of the payload data, transmitting a data reception complete indication from the wireless device to the host.

6. The method of claim 1, wherein the wireless signal is defined according to the Wireless Universal Serial Bus (WUSB) protocol.

7. The method of claim 1, further comprising:
hardwire connecting the wireless device to the host via a connector; and
receiving a hardwired signal from the host device, wherein the hardwired signal is defined in accordance with a serial data communication protocol.

8. The method of claim 1, further comprising, if the power state indication indicates the power state is below the threshold value, storing overhead information related to the storing of payload data.

9. The method of claim 8, wherein the overhead information comprises at least one of a data size for the payload data and a storage location in the non-volatile memory unit for the payload data.

10. A method of operating a wireless device including a power supply source, a controller, and a non-volatile memory unit, the method comprising:
receiving a wireless signal from a host device, wherein the wireless signal is defined in accordance with a serial data communication protocol;
extracting a read command from the wireless signal;
retrieving payload data from the non-volatile memory unit in response to the read command and transmitting the payload data to the host;
generating a power measurement command by the controller;
detecting a power state for the power supply source in response to the power measurement command and generating a power state indication based on the detected power state;
if the power state indication indicates the power state is above a threshold value, continuing the retrieving and transmitting of the payload data until all of the payload data is transmitted; and
if the power state indication indicates the power state is below the threshold value, transmitting a power deficient indication from the wireless device to the host and interrupting the retrieving and transmitting of the payload data.

11. The method of claim 10, further comprising:
following interrupting of the retrieving and transmitting of the payload data, determining that the power state has increased above the threshold value; and thereafter,
transmitting a power sufficient indication from the wireless device to the host; and
transmitting a non-transmitted portion of the payload data that was not transmitted before the interrupting of the retrieving and transmitting of the payload data.

12. The method of claim 10, wherein the power state indication enables a user indication regarding a usable residual time for the wireless device related to power remaining in the power supply source.

13. The method of claim 10, wherein the power state indication enables a user indication regarding a ratio of current power to maximum power for the power supply source.

14. The method of claim 11, further comprising:
following the transmitting of the not transmitted portion of the payload data, transmitting a data transmission complete indication from the wireless device to the host.

15. The method of claim 10, wherein the non-volatile memory unit is NAND flash memory.

16. The method of claim 10, wherein the wireless signal is defined according to the Wireless Universal Serial Bus (WUSB) protocol.

17. The method of claim 10, further comprising:
hardwire connecting the wireless device to the host via a connector; and
receiving a hardwired signal from the host device, wherein the hardwired signal is defined in accordance with a serial data communication protocol.

18. The method of claim 10, further comprising, if the power state indication indicates the power state is below the threshold value, storing residual data information related to a not transmitted portion of the payload data that was not transmitted before the interrupting of the retrieving and transmitting of the payload data.

19. The method of claim 18, wherein the residual data information comprises a last address related to a portion of the payload data transmitted before interrupting of the retrieving and transmitting of the payload data.

20. The method of claim 18, further comprising:
following interrupting of the retrieving and transmitting of the payload data, determining that power state has increased above provided by the power supply source exceeds the threshold value; and thereafter,
transmitting a power sufficient indication from the wireless device to the host; and
transmitting the not transmitted portion of the payload data in accordance with the residual data information.

21. A method of operating a wireless device using a Wireless Universal Serial Bus (WUSB) protocol, the method comprising:
receiving data from a host;
detecting a power state for a power supply source and generating a power state indication based on the detected power state;
if the power state indication indicates the power state is below the threshold value, transmitting a power deficient state indication from the wireless device to the host for interrupting the transmitting of the data to the wireless device; and
after the transmitting a power deficient indication, if the power state indication indicates the power state increases above the threshold value, transmitting a power sufficient state indication from the wireless device to the host for resuming the transmitting of the data to the wireless device.

22. A method of operating a wireless device using a Wireless Universal Serial Bus (WUSB) protocol, the method comprising:
- transmitting data to a host;
- detecting a power state for a power supply source and generating a power state indication based on the detected power state;
- if the power state indication indicates the power state is below the threshold value, transmitting a power deficient state indication from the wireless device to the host and interrupting the transmitting of the data; and
- after the interrupting the transmitting, if the power state indication indicates the power state increases above the threshold value, resuming the transmitting of the data.

* * * * *